United States Patent [19]

Maucher

[11] Patent Number: 5,152,385
[45] Date of Patent: Oct. 6, 1992

[54] FRICTION CLUTCH

[75] Inventor: Edmund Maucher, Wooster, Ohio

[73] Assignee: Luk Lamellen und Kupplungsbau GmbH, Bühl, Fed. Rep. of Germany

[21] Appl. No.: 525,215

[22] Filed: Apr. 11, 1990

Related U.S. Application Data

[63] Continuation of Ser. No. 290,508, Dec. 23, 1988, abandoned.

[51] Int. Cl.⁵ .............................................. F16D 13/50
[52] U.S. Cl. ................................ 192/70.27; 192/89 B
[58] Field of Search ............... 192/30 V, 89 B, 70.17, 192/109 A, 70.18, 70.27

[56] References Cited

U.S. PATENT DOCUMENTS

| | | | |
|---|---|---|---|
| 3,323,624 | 6/1967 | Maurice | 192/109 A |
| 3,554,342 | 1/1971 | Spokas | 192/70.18 |
| 4,069,905 | 1/1978 | de Gennes | 192/70.18 X |
| 4,122,929 | 10/1978 | Maucher et al. | 192/70.18 |
| 4,184,578 | 1/1980 | Moore et al. | 192/89 B |
| 4,291,792 | 9/1981 | Henao | 192/89 B |
| 4,526,258 | 7/1985 | Huber | 192/88 A |
| 4,556,136 | 12/1985 | Lech. Jr. | 192/70.17 X |
| 4,558,773 | 12/1985 | Schäfer | 192/70.17 X |
| 4,560,366 | 12/1985 | Loizeau | 192/70.17 X |
| 4,601,376 | 7/1986 | Reik | 192/89 B |
| 4,676,357 | 6/1987 | Trotman et al. | 192/89 B |
| 4,723,463 | 2/1988 | Reik et al. | 74/574 |
| 4,744,448 | 5/1988 | Maycock et al. | 192/89 B X |
| 4,770,282 | 9/1988 | Maycock et al. | 192/89 B X |
| 5,054,598 | 10/1991 | Tojima | 192/89 B X |

FOREIGN PATENT DOCUMENTS

| | | | |
|---|---|---|---|
| 2072770 | 10/1981 | United Kingdom | 192/30 V |
| 2184514 | 6/1987 | United Kingdom | 192/30 V |

Primary Examiner—Peter M. Cuomo
Attorney, Agent, or Firm—Peter K. Kontler

[57] ABSTRACT

A friction clutch for use in motor vehicles wherein a clutch plate can be clamped between an engine-driven flywheel and an axially movable pressure plate. The pressure plate is axially movably coupled to the housing of the clutch by a set of leaf springs, and the housing carries a tiltable diaphragm spring which biases the pressure plate toward the clutch plate in engaged condition of the friction clutch. That side of the pressure plate which faces the diaphragm spring carries an elastically deformable insert which is engaged by the diaphragm spring in engaged or disengaged condition of the friction clutch to thus reduce the likelihood of vibration of the pressure plate, particularly when the clutch is disengaged.

19 Claims, 3 Drawing Sheets

FRICTION CLUTCH

This application is a continuation of Ser. No. 290,508, filed Dec. 23, 1988, now abandoned.

BACKGROUND OF THE INVENTION

The invention relates to friction clutches in general, especially for use in motor vehicles, and more particularly to improvements in friction clutches of the type wherein a pressure plate is movable axially by a diaphragm spring so as to bias a clutch plate against a flywheel or another rotary part.

It is known to tiltably mount the diaphragm spring of a friction clutch at the inner side of a housing or cover which can be made of metallic sheet material and is rotated by a flywheel to thereby rotate an axially movable pressure plate which can be biased by the diaphragm spring in a direction toward the flywheel whereby a clutch plate of the friction clutch is clamped between the pressure plate and the flywheel and can transmit torque to the input shaft of a variable-speed transmission in a motor vehicle. The flywheel is driven by the engine, either directly or through the medium of a second flywheel.

When the friction clutch is engaged or disengaged, vibrations and/or other stray movements which are or can be caused by the running engine are transmitted to the pressure plate. The mass of the pressure plate is rather pronounced, and the aforementioned vibrations cause the pressure plate to wobble relative to the diaphragm spring and/or to perform other axial (e.g., vibratory) movements in directions toward and away from the diaphragm spring. It has been found that stray movements of the pressure plate relative to the diaphragm spring are especially likely to develop in response to partial or complete disengagement of the friction clutch, i.e., in response to partial or complete interruption of transmission of torque between the engine and the transmission. This entails repeated lifting of the pressure plate off and repeated propulsion of the pressure plate against the diaphragm spring. The result is a hammering or rattling noise which is transmitted to other parts such as the clutch pedal and the chassis of the motor vehicle. The thus amplified noise causes discomfort to the occupant or occupants of the vehicle.

Attempts to reduce noise which is caused by the pressure plate during disengagement of a friction clutch include the provision of so-called lifting yokes which are interposed between the diaphragm spring and the pressure plate and perform the additional function of disengaging the pressure plate from the diaphragm spring. To this end, the yokes are mounted on the pressure plate in such a way that they cause the pressure plate to move axially and away from the diaphragm spring when the latter is tilted relative to the clutch housing during engagement or disengagement of the friction clutch. Reference may be had, for example, to FIG. 9 of German Pat. No. 12 33 670.

It has been found that the just discussed yokes cannot be put to use in all types of friction clutches because they fail to invariably disengage the pressure plate from the diaphragm spring so that the pressure plate can initiate the generation of undesirable and often unacceptable noise in response to partial or complete disengagement of the friction clutch.

OBJECTS OF THE INVENTION

An object of the invention is to provide a friction clutch whose operation is quieter than that of heretofore known friction clutches.

Another object of the invention is to provide a novel and improved pressure plate for use in the above outlined friction clutch.

A further object of the invention is to provide a novel and improved method of preventing the propagation of stray movements from the pressure plate to other parts of the friction clutch.

An additional object of the invention is to provide a power train which can be used in motor vehicles and embodies the above outlined friction clutch.

Still another object of the invention is to provide a friction clutch which can be assembled in a simple and time-saving manner.

A further object of the invention is to provide the friction clutch with novel and improved means for limiting the extent of movability of the diaphragm spring and pressure plate relative to each other.

An additional object of the invention is to provide the friction clutch with a device which is capable of effectively damping stray movements of the pressure plate irrespective of the condition of the clutch and irrespective of the position of the diaphragm spring with reference to its housing.

SUMMARY OF THE INVENTION

The invention is embodied in a friction clutch, particularly for use in motor vehicles. The improved friction clutch comprises a rotary housing or cover which can receive torque from an engine-driven flywheel, a pressure plate which can be moved axially into and from engagement with a clutch plate or clutch disc on the input shaft of the variable-speed transmission in a motor vehicle, means for non-rotatably but axially movably coupling the pressure plate to the housing, a diaphragm spring which is tiltably mounted on the housing and serves to bias the pressure plate in engaged condition of the clutch so that the clutch plate is frictionally engaged by the pressure plate and the flywheel, and damper means including an insert which is disposed between the pressure plate and the diaphragm spring in direct contact with the diaphragm spring. The insert can contain (and can consist of) a plastic material.

The diaphragm spring is tiltable (e.g., by an axially movable bearing) with reference to the housing between a first position in which the clutch is engaged (because the diaphragm spring urges the pressure plate against the clutch plate which, in turn, is biased against the flywheel), and a second position in which the clutch is disengaged (for example, because the aforementioned coupling means is free to disengage the pressure plate from the clutch plate). The insert is preferably made of a material which is elastically deformable, and the insert is preferably deformed by the diaphragm spring in each of the first and second positions, i.e., even when the clutch is disengaged.

The pressure plate is preferably provided with a circumferentially complete or with an interrupted annular motion receiving portion which confronts the diaphragm spring and has a predetermined diameter. The insert can resemble or constitute a ring which is concentric with the motion receiving portion of the pressure plate and has a diameter which matches or approximates the predetermined diameter, i.e., the insert can be installed in or on the motion receiving portion of the pressure plate. Alternatively, the diameter of the ring-shaped insert can be smaller (e.g., only slightly smaller) than the predetermined diameter of the annular motion receiving portion of the pressure plate.

The insert can be made of or can contain an elastomeric material, such as natural or synthetic rubber. As mentioned above, the insert can constitute a ring, namely a multiple-segment or multiple-portion ring or a circumferentially complete ring. In accordance with a presently preferred embodiment, the insert is assembled of a plurality of arcuate sections each of which contains or consists of a plastic material. The sections can be received in recesses which are provided therefor in the pressure plate. For example, each of a plurality of discrete arcuate sections of the insert can be form-lockingly connected with the pressure plate. Alternatively, the plastic sections of the insert can be adhesively secured or otherwise bonded to the pressure plate.

The aforementioned coupling means can comprise a plurality of spring elements (particularly leaf springs) which serve to bias the pressure plate and the insert axially toward the diaphragm spring with a force which suffices to ensure that the diaphragm spring deforms the elastic material of the insert in the second position of the diaphragm spring, i.e., when the clutch is disengaged. The bias of the springy elements preferably suffices to ensure that the insert is compressed and enables the diaphragm spring to remain in direct metal-to-metal contact with the pressure plate in the second position of the diaphragm spring.

The clutch can further comprise means (e.g., a part of the pressure plate) for limiting the extent of deformation of the elastically deformable insert between the pressure plate and the diaphragm spring. The arrangement can be such that the limiting means confines deformation of the insert to a range of between 0.3 and 1.5 mm (in the axial direction of the diaphragm spring and the pressure plate).

The aforementioned annular motion receiving portion of the pressure plate can include an annulus of protuberances which confront the diaphragm spring and have preferably arcuate recesses for arcuate median portions of discrete sections of the insert. Each section can further comprise two enlarged (e.g., spherical) end portions which are adjacent the respective protuberance.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 *a* is an enlarged view of a detail in FIG. 2;

DESCRIPTION OF PREFERRED EMBODIMENTS

Figure 1:
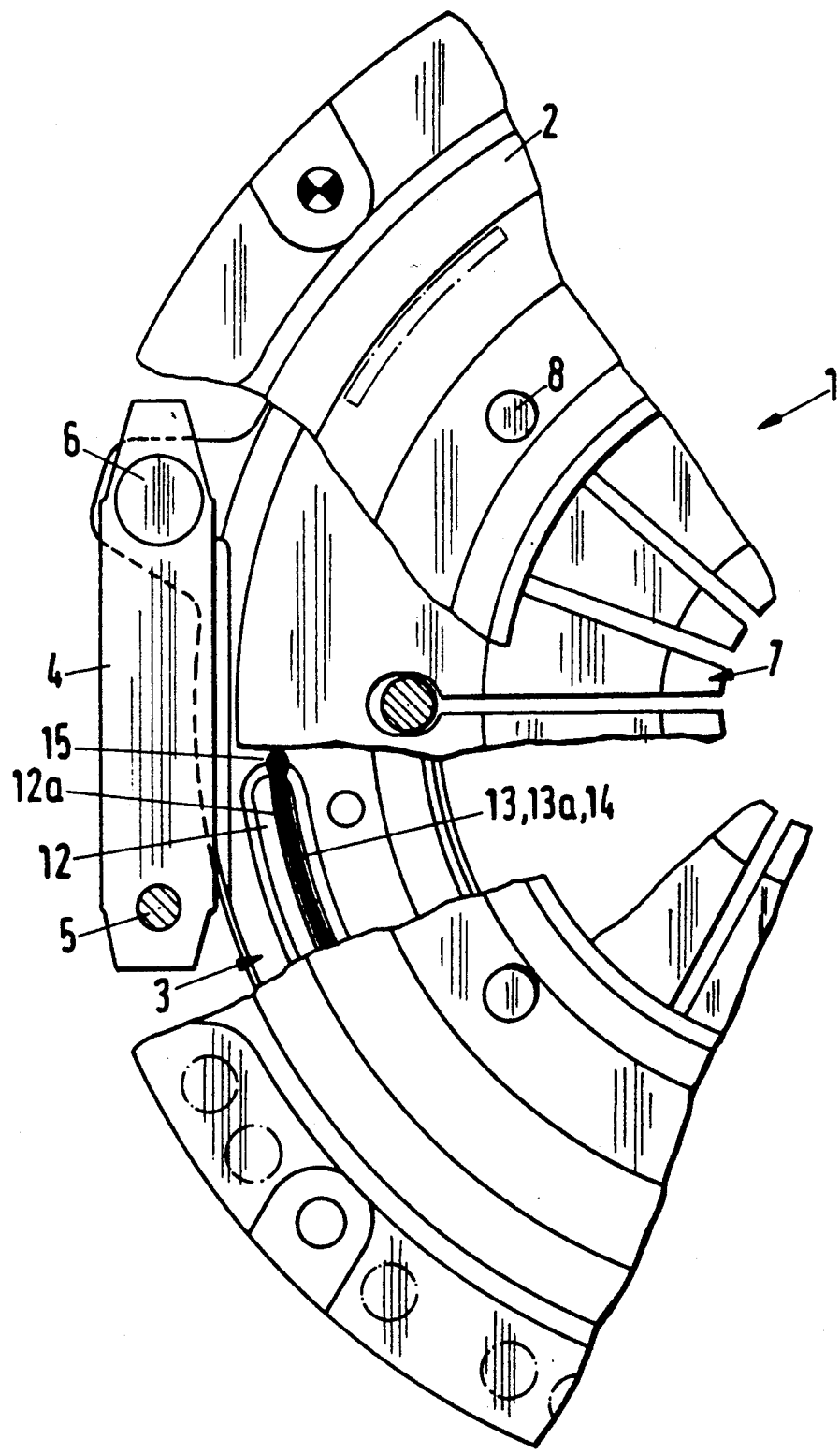
FIG. 1 is a fragmentary elevational view of a portion of a friction clutch which embodies one form of the invention.
Figure 2:
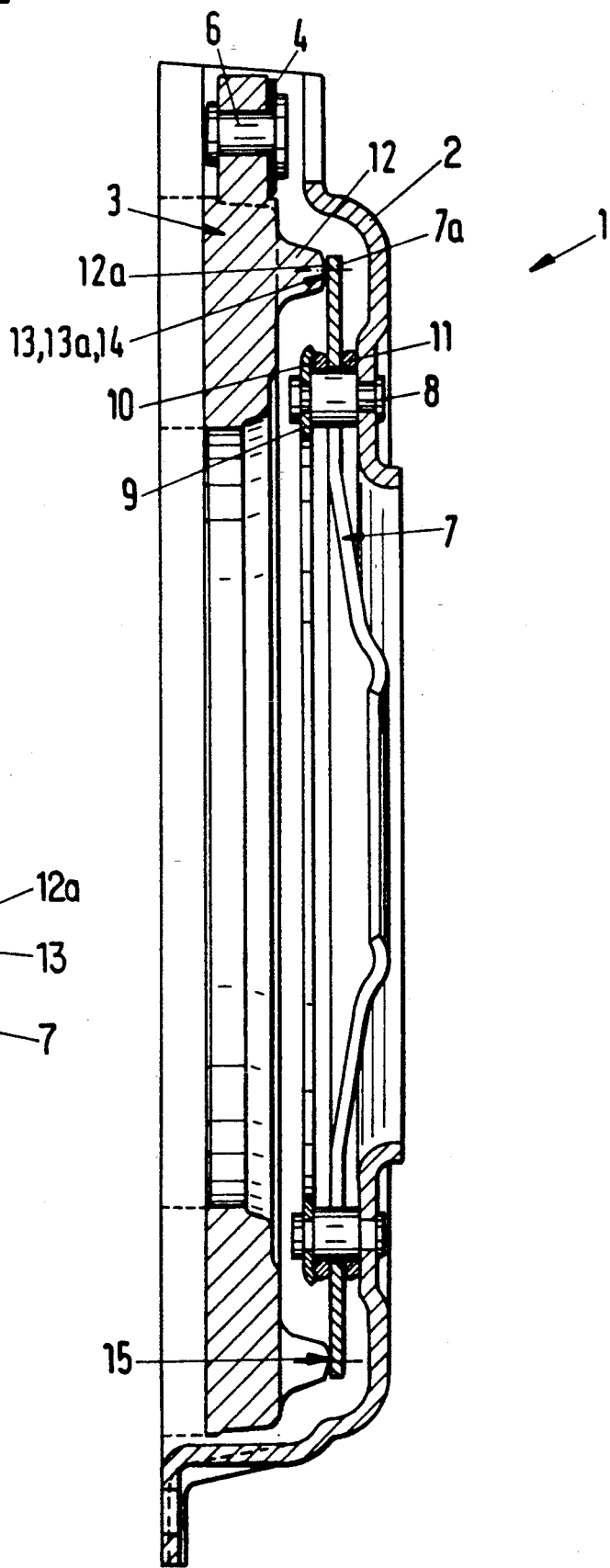
FIG. 2 is an axial sectional view of the friction clutch which embodies the structure of FIG. 1.
Figure 2A:
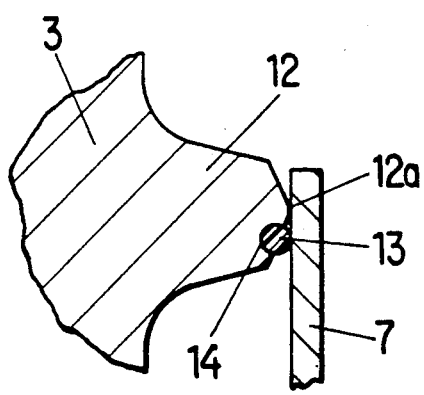

FIGS. 1, 2 and 2a show a portion of a friction clutch 1 which comprises a housing 2 (e.g., a cover made of metallic sheet material) which is secured to a flywheel (not shown) on the crankshaft of an internal combustion engine in a motor vehicle or to a flywheel which is rotatable relative to as well as with a second flywheel on a crankshaft. The clutch 1 further comprises an axially movable pressure plate 3 which is installed between the housing 2 and the flywheel and is axially movably but non-rotatably coupled to the housing by a set of springy elements 4 (preferably in the form of leaf springs). Each element 4 is attached to the housing 2 by a rivet 5 and to the pressure plate 3 by a rivet 6. A diaphragm spring 7 is tiltably mounted at the inner side of the housing 2 and serves to bias the pressure plate 3 axially away from the housing 2 when the clutch 1 is engaged so that the pressure plate 3 cooperates with the flywheel to clamp a clutch plate (not shown) whereby the clutch plate transmits torque to the input shaft of a variable-speed transmission in a motor vehicle. Reference may be had to commonly owned U.S. Pat. No. 4,723,463 granted Feb. 9, 1988 to Reik et al. FIG. 2 shows the diaphragm spring 7 in that position in which the clutch 1 is engaged, i.e., the radially outermost portion 7a of the diaphragm spring biases the pressure plate 3 axially in a direction to the left toward the flywheel.

The means for tiltably mounting the diaphragm spring 7 at the inner side of the housing 2 comprises two ring-shaped seats 10, 11 which flank the diaphragm spring, a resilient washer-like retainer 9 which is inwardly adjacent the seat 10, and a set of rivets 8 which are anchored in the housing 2 and have heads overlying the inner side of the retainer 9. That side of the pressure plate 3 which faces the diaphragm spring 7 includes an annular motion receiving portion composed of an annulus of discrete arcuate protuberances or projections 12 defining a circumferentially incomplete annulus with a central region 12a which is contacted by the radially outermost portion 7a of the diaphragm spring 7.

In accordance with a feature of the invention, the friction clutch 1 further comprises a damper which is installed radially inwardly of the region 12a and includes an insert 13 of elastically deformable material. The insert 13 of FIGS. 1 and 2 includes a set of arcuate sections 13a each having a median portion received in a arcuate recess 14 of the respective protuberance 12 and two enlarged end portions 15 which are adjacent the ends of the respective protuberance. The dimensions of the sections 13a are preferably selected in such a way that, when the portion 7a of the diaphragm spring 7 is out of contact with the sections 13a, each of these sections projects from the respective recess 14 in a direction toward the housing 2 through a distance of 0.4 to 0.7 mm.

The elements 4 of the coupling means between the housing 2 and the pressure plate 3 are installed in prestressed condition in such a way that they urge the pressure plate toward the diaphragm spring 7. The stressing of elements 4 is preferably such that, when the clutch 1 is disengaged (namely when the radially inwardly extending prongs of the diaphragm spring 7 are depressed in a direction toward the pressure plate 3 by a suitable disengaging element, such as that disclosed in commonly owned U.S. Pat. No. 4,526,258 granted Jul. 2, 1985 to Huber), the diaphragm spring continues to elastically deform the insert to an extent which is necessary to establish a metal-to-metal contact between the radially outermost portion 7a of the diaphragm spring and the protuberances 12 of the pressure plate 3. This ensures that, when the engine rotates the housing 2 and the pressure plate 3 while the clutch 1 is disengaged, vibrations and/or other stray movements of the pressure plate 3 (especially those initiated by the engine) which are sufficiently pronounced to repeatedly lift the pressure plate off the portion 7a of the diaphragm spring 7 are damped, at least in part, by the elastically deformable insert 13. Thus, even though the mass of the pressure plate 3 is rather substantial, the insert 13 is capable of counteracting axial vibrations of the pressure plate . 3, at least to the extent of ensuring that the pressure plate cannot strike against the diaphragm spring with a pronounced force which would propagate the stray movements to other parts and could give rise to the generation of readily detectable noise.

The purpose of the spherical or otherwise configurated enlarged portions 15 at the ends of the arcuate sections 13a is to prevent the median portions of such sections from moving in their recesses in the circumferential direction of the pressure plate 3. The sections 13a of the insert 13 can be made of natural or synthetic rubber or any other material (particularly a plastic material) which exhibits the necessary elasticity to damp stray movements of the pressure plate 3 relative to the diaphragm spring 7, particularly in disengaged condition of the clutch 1.

Figure 3:
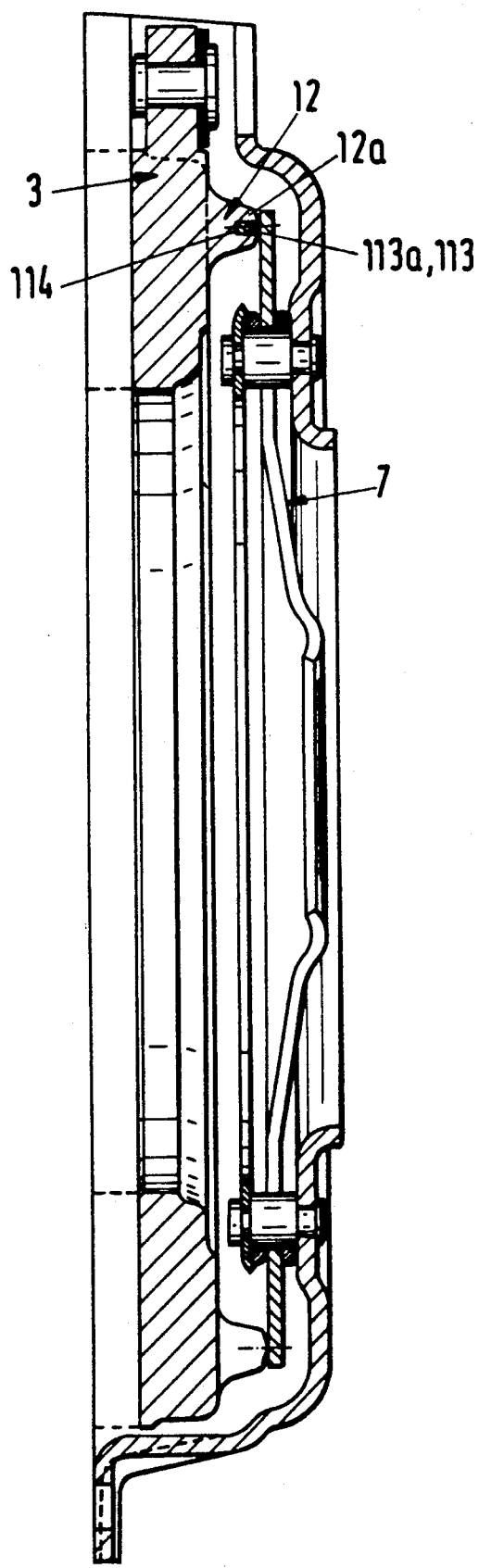
FIG. 3 is an axial sectional view of a portion of a modified friction clutch.

FIG. 3 shows a portion of a modified friction clutch wherein the damper includes a composite insert 113 having a ring of discrete cylindrical sections 113a of rubber or a like i elastomeric material. The sections 113a are received in discrete axially parallel recesses or sockets 114 in the form of blind bores or holes which are provided in the protuberances 12. The diameter of the ring of sections 113a matches or closely approximates the diameter of the annular region 12a where the radially outermost portion of the diaphragm spring 7 contacts the protuberances 12. For example, each of the protuberances 12 can be provided with a plurality (such as three) of recesses 114 for discrete cylindrical sections 113a. The recesses 114 in each of the protuberances 12 extend along an arc in the circumferential direction of the pressure plate 3. When not deformed by the diaphragm spring 7, the sections 113a project beyond the respective recesses 114 in a direction toward the diaphragm spring. The purpose of these sections is the same as that of arcuate sections 13a forming the insert 13 in the friction clutch 1 of FIGS. 1 and 2.

It is also within the purview of the invention to install, to dimension, and to select the material of, the sections 13a or 113a in such a way that they prevent any direct metal-to-metal contact between the diaphragm spring 7 and the pressure plate 3 in disengaged or engaged condition of the clutch. In other words the insert 13 or 113 can be designed and mounted to take up the entire bias of the diaphragm spring 7 in each position of the diaphragm spring with reference to the housing 2. The springy elements 4 of such clutch are preferably designed and mounted to bias the pressure plate 3 axially toward the diaphragm spring 7, the same as in the illustrated embodiments.

Still further, the invention can be embodied with equal advantage in friction clutches wherein the prongs of the diaphragm spring must be pulled away from the pressure plate instead of being pushed toward the pressure plate (as in the embodiments which are shown in FIGS. 1-2 and 3). In such friction clutches (known as pull-type clutches), the radially outermost portion of the diaphragm spring (radially inwardly of the seats for the diaphragm spring) engages a motion receiving portion of the pressure plate. Reference may be had to commonly owned U.S. Pat. No. 4,601,376 granted Jul. 22, 1986 to Reik.

Figure 5:
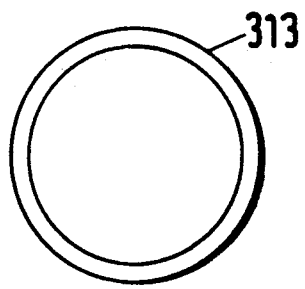
FIG. 5 is an elevational view of a circumferentially complete ring-shaped insert.

It is also possible to provide an insert in the form of a circumferentially complete ring (see the insert 313 of FIG. 5) which is installed in a complementary recess or groove of a circumferentially complete protuberance at that side of the pressure plate 3 which confronts the diaphragm spring. For example, the insert 313 of FIG. 5 can constitute an O-ring. The provision of a number of discrete arcuate or cylindrical sections 13a or 113a which are spaced apart from each other in the circumferential direction of the pressure plate 3 is preferred in many instances because this renders it possible to replace defective sections without removing the remaining (satisfactory) sections.

Figure 4:
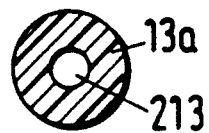
FIG. 4 is a sectional view of a reinforced section of the insert.

It is further within the purview of the invention to reinforce some or all of the sections of the improved insert. For example, each of the arcuate sections can be reinforced to exhibit a certain amount of stiffness, i.e., to retain its shape, which facilitates insertion of such reinforced sections into arcuate recesses 14 of the protuberances 12. For example, each of the sections 13a can be reinforced by one or more wires 213 (FIG. 4) which are embedded into the elastomeric material. This can be accomplished by resorting to any conventional machine which is capable of applying an elastomeric envelope to pieces of wire or other suitable reinforcing material. The envelope can be made of natural or synthetic rubber or of any other suitable elastomeric material which can stand the stresses developing in a friction clutch and which can adequately damp stray movements of the diaphragm spring and pressure plate relative to each other.

The sections 13a and/or 113a can be form-lockingly received in the respective recesses 14 or 114 so that a portion of each section projects beyond the respective recess, at least when the sections are not compressed by the diaphragm spring 7. The surfaces bounding the recesses 14 and 114 serve to frictionally hold the inserted portions of the respective sections as well as to prevent radial movements of the sections with reference to the pressure plate. Alternatively, each section of the insert can include one or more relatively small portions which are received in a recess of the pressure plate. For example, each section 13a can have two extensions which fit into complementary recesses of the respective protuberance 12. The extensions can be received in the respective recesses by snap action, or they can be a press fit in the recesses. In lieu of a form-locking connection, it is also possible to rely on bonded connections, e.g., by securing the sections of the insert or the ring-shaped insert 313 to the pressure plate with a suitable adhesive. Still further, it is possible to employ an adhesive and to also establish a mechanical connection between each section and the pressure plate or between the ring 313 and the pressure plate.

It is presently preferred to design the insert in such a way that the diaphragm spring 7 is in direct contact with the pressure plate 3 when the clutch is engaged. However, and as mentioned above, it is also possible to select the dimensions and the material of the insert in such a way that the insert prevents any direct contact between the pressure plate and the diaphragm spring in each condition of the clutch, i.e., in each position of the diaphragm spring with reference to the housing. Direct contact between the pressure plate and the diaphragm spring in disengaged condition of the clutch can be ensured by the springy elements 4, i.e., these elements can be installed in prestressed condition to ensure that they urge the pressure plate 3 toward the diaphragm spring 7 with a force which suffices to guarantee the establishment of direct contact between such parts in each position of the diaphragm spring with reference to the housing 2. Certain portions of the protuberances 12 then constitute a means for limiting the extent of compression or deformation of the sections 13a or 113a, i.e., these sections need not take up the entire force of the diaphragm spring because, when the pressure plate 3 assumes a predetermined axial position with reference to the housing 2 under the action of the elements 4, the protuberances 12 bear directly against the diaphragm spring to thereby limit the extent of deformation of the sections 13a or 113a. The same holds true for the insert 313. For example, the limiting means of the pressure plate 3 can be designed to maintain the extent of compressibility of the sections 13a or 113a within a range of 0.3 and 1.5 mm.

An important advantage of the improved friction clutch is that the insert 13, 113 or 313 (or an analogous insert) can greatly reduce the amount of (or to eliminate) noise which would be generated, especially in disengaged condition of the diaphragm spring, as a result of stray movements of the pressure plate with reference to the diaphragm spring. All this is accomplished with the simple expedient of placing a damper between the diaphragm spring and the pressure plate, preferably at or close to the locus of metal-to-metal contact between these two parts.

An advantage of an elastomeric insert is that such insert is capable of yielding to the force of the diaphragm spring 7 and/or springy elements 4 as well as that it exhibits inherent damping characteristics so that deformation of the elastomeric material entails the development of hysteresis. This further enhances the damping characteristics of the insert by ensuring that the pressure plate cannot strike against the diaphragm spring with a pronounced force which would entail the generation of noise and/or other undesirable effects, such as extensive wear.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, particularly for use in motor vehicles, comprising a housing; a pressure plate non-rotatably coupled to said housing; a diaphragm spring tiltably mounted on said housing and arranged to bias said pressure plate, said pressure plate having an annular portion confronting and being directly engageable by said diaphragm spring and said diaphragm spring being tiltable between a first position in which h the clutch is engaged and a second position in which the clutch is disengaged; damper means including an insert disposed between said pressure plate and said diaphragm spring and containing an elastically deformable material which is in direct contact with said diaphragm spring and exhibits inherent damping characteristics to cause the development of hysteresis in response to deformation of said insert; and springy elements arranged to bias said pressure plate and said insert toward said diaphragm spring with a force such that the diaphragm spring deforms said insert in said section position.

2. The clutch of claim 1, wherein said insert contains a plastic material.

3. The clutch of claim 1, wherein said insert is deformed by said diaphragm spring in each of said first and second positions.

4. The clutch of claim 1, wherein said annular portion has a predetermined diameter, said insert being ring shaped, concentric with said annular portion and having a diameter matching or approximating said predetermined diameter, said annular portion directly engaging said diaphragm spring in engaged condition of the clutch.

5. The clutch of claim 1, wherein said annular portion has a predetermined diameter, said insert being ring-shaped, concentric with said annular portion and having a diameter smaller than said predetermined diameter, said annular portion directly engaging said diaphragm spring in engaged condition of the clutch.

6. The clutch of claim 1, wherein said insert consists of an elastomeric material.

7. The clutch of claim 6, wherein said elastomeric material is rubber.

8. The clutch of claim 1, wherein said insert includes a ring.

9. The clutch of claim 8, wherein said ring is a circumferentially complete ring.

10. The clutch of claim 1, wherein said insert comprises a plurality of elongated arcuate sections containing a plastic material and extending in the circumferential direction of said pressure plate.

11. The clutch of claim 1, wherein said insert comprises a plurality of sections and said pressure plate has recesses for said sections.

12. The clutch of claim 1, wherein said insert comprises a plurality of discrete plastic sections each of which is form-lockingly connected with said pressure plate.

13. The clutch of claim 1, wherein said insert comprises a plurality of plastic sections which are bonded to said pressure plate.

14. The clutch of claim 1, wherein said springy elements include leaf springs.

15. The clutch of claim 1, wherein the bias of said springy elements is sufficient to maintain said diaphragm spring in direct contact with said pressure plate in said second position as a result of compression of said insert.

16. The clutch of claim 1, wherein said insert contain a plastic material, and further comprising means for limiting the extent of deformation of said insert between said pressure plate and said diaphragm spring.

17. The clutch of claim 16, wherein said means for limiting is arranged to limit the extent of deformation of said insert between said diaphragm spring and said pressure plate to 0.3–1.5 mm.

18. The clutch of claim 1, wherein said annular portion includes an annulus of protuberances and said protuberances have recesses, said insert including discrete sections having median portions received in said recesses and enlarged end portions adjacent the respective protuberances.

19. The clutch of claim 18 wherein each of said recesses and each of said median portions has an arcuate shape.

* * * * *